Feb. 8, 1944.     J. BOUCEK     2,341,077
MARINE VESSEL
Filed Oct. 14, 1942     3 Sheets-Sheet 2

Inventor
Jan Boucek

By Clarence A. O'Brien
and Harvey B. Jacobson
Attorneys

Patented Feb. 8, 1944

2,341,077

UNITED STATES PATENT OFFICE 2,341,077

MARINE VESSEL

Jan Boucek, Los Angeles, Calif.

Application October 14, 1942, Serial No. 462,018

1 Claim. (Cl. 115—20)

This invention relates to new and useful improvements in marine vessels and more particularly to a marine vessel having a revolving hull.

The principal object of the present invention is to provide a powered marine vessel in the form of a large paddle wheel in which is suspended suitable passenger compartments and accommodiations for various equipment that must necessarily remain on a given plane.

Other objects and advantages of the invention will become apparent to the reader of the following description.

Figure 1:
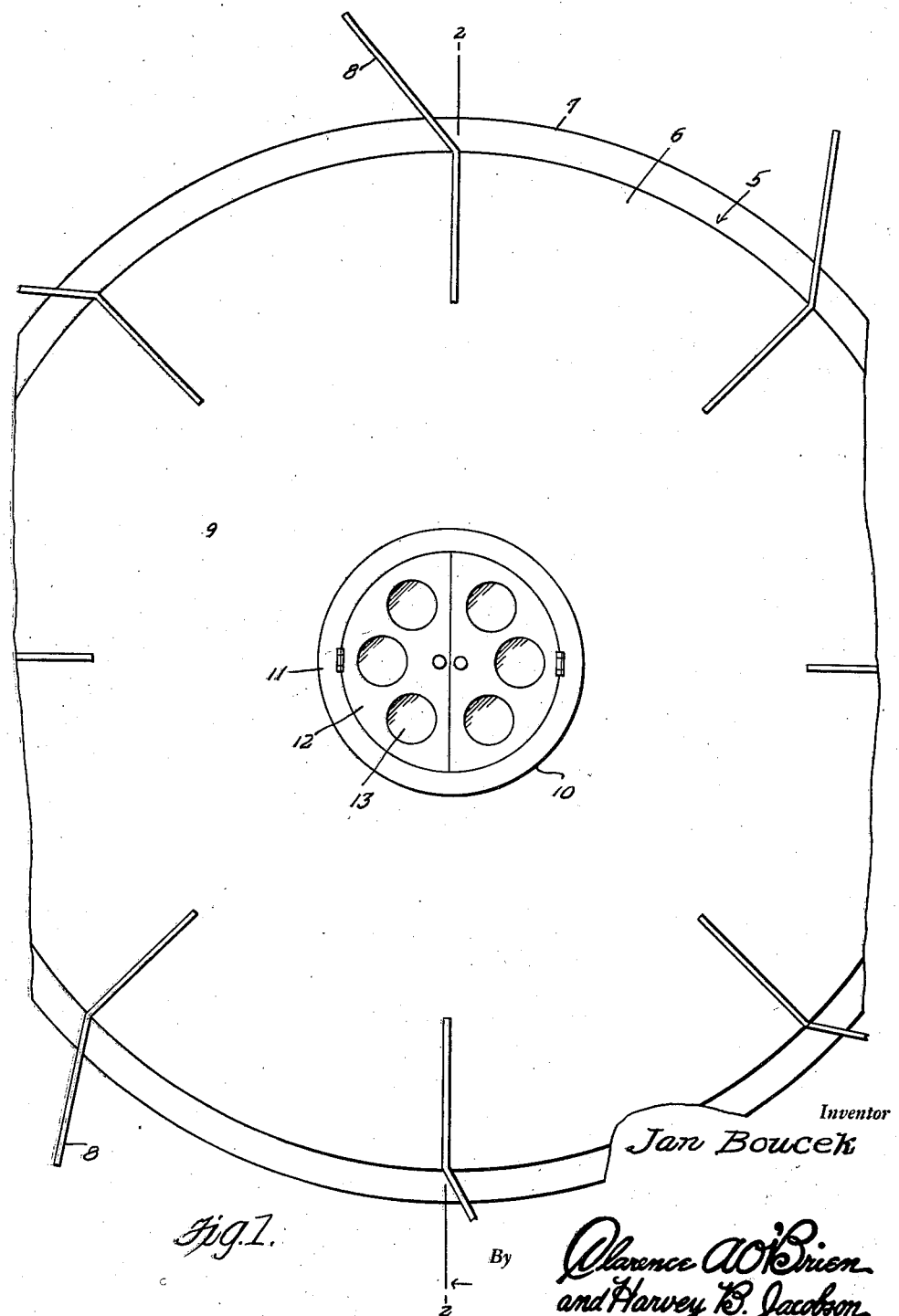
Figure 1 represents a fragmentary side elevational view of the vessel.
Figure 2:
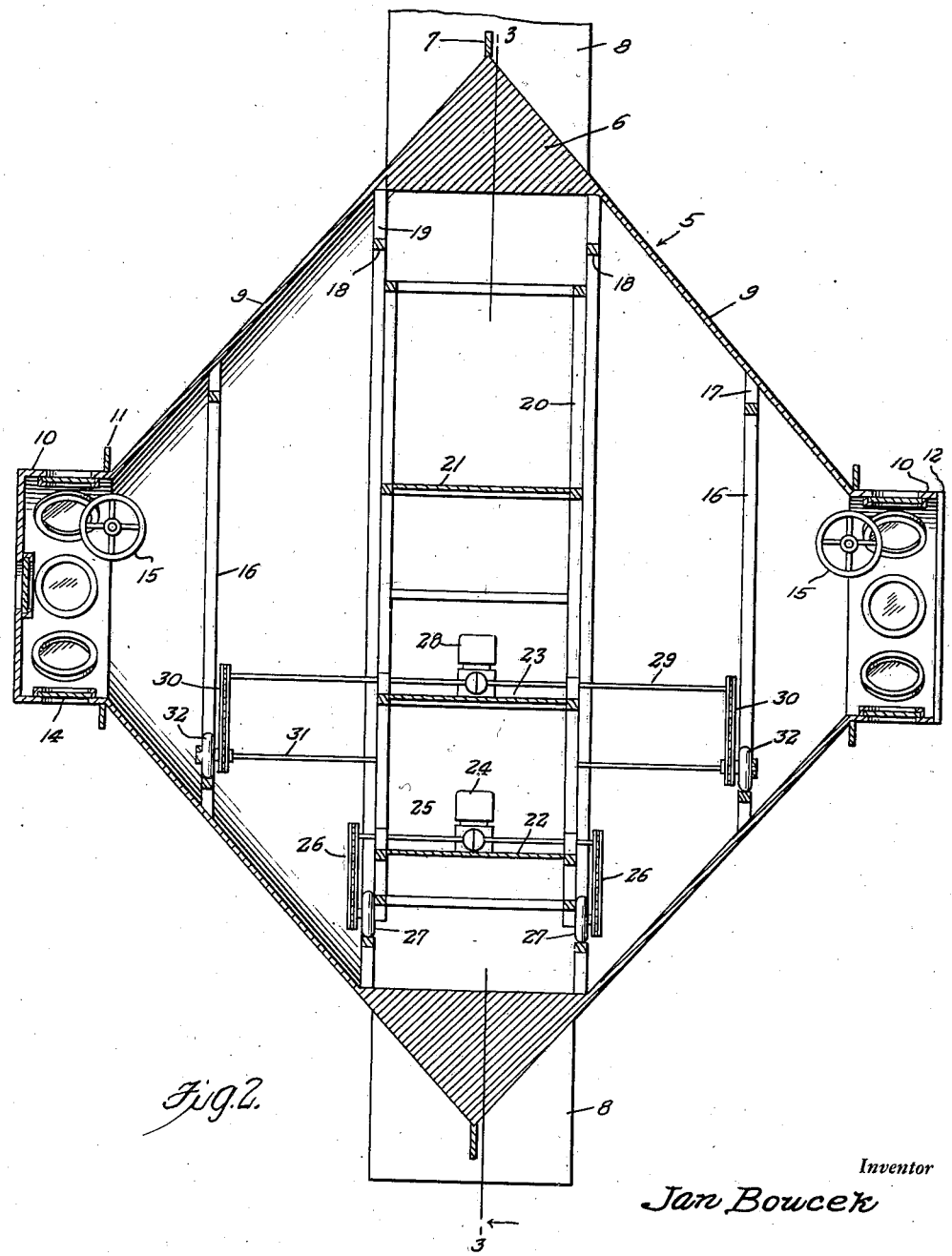
Figure 2 is a vertical sectional view taken substantially on the line 2—2 of Figure 1.

Referring to the drawings wherein like numerals designate like parts, it can be seen that numeral 5 generally refers to a hull construction which includes an annular keel structure 6 of triangular cross section and provided at its outermost edge portion with a circumferentially extending flange 7. This keel structure 6 has a plurality of obliquely disposed driving fins 8 protruding therefrom.

Frusto-conical shaped shells 9 protrude outwardly from the keel structure 6 and terminate in cylindrical shaped vestibules 10, 10 at the inner ends of which are circumferentially disposed guard flanges for causing water from the shells 9 to gutter off before riding over vestibules.

The vestibules 10 may each have hinged doors 12 in which are port holes and windows 13. It is also preferable that the circumferential portion of the vestibules 10 be also provided with port holes and windows 14. At each of the vestibules 10 is a steering wheel for steering a suitable rudder or the like (not shown).

Mounted at the intermediate interior portion of each of the shells 9 is a circular track 16 suitably secured as at 17 to the corresponding shell. Inside of the keel structure 6 are larger annular tracks 18, 18 positively secured by suitable connectors 19 to the keel structure 6.

Located within the space between the tracks 18, 18 is a cage structure 20 having upper, lower and intermediate decks 21, 22 and 23 for carrying passengers and various equipment.

Figure 3:
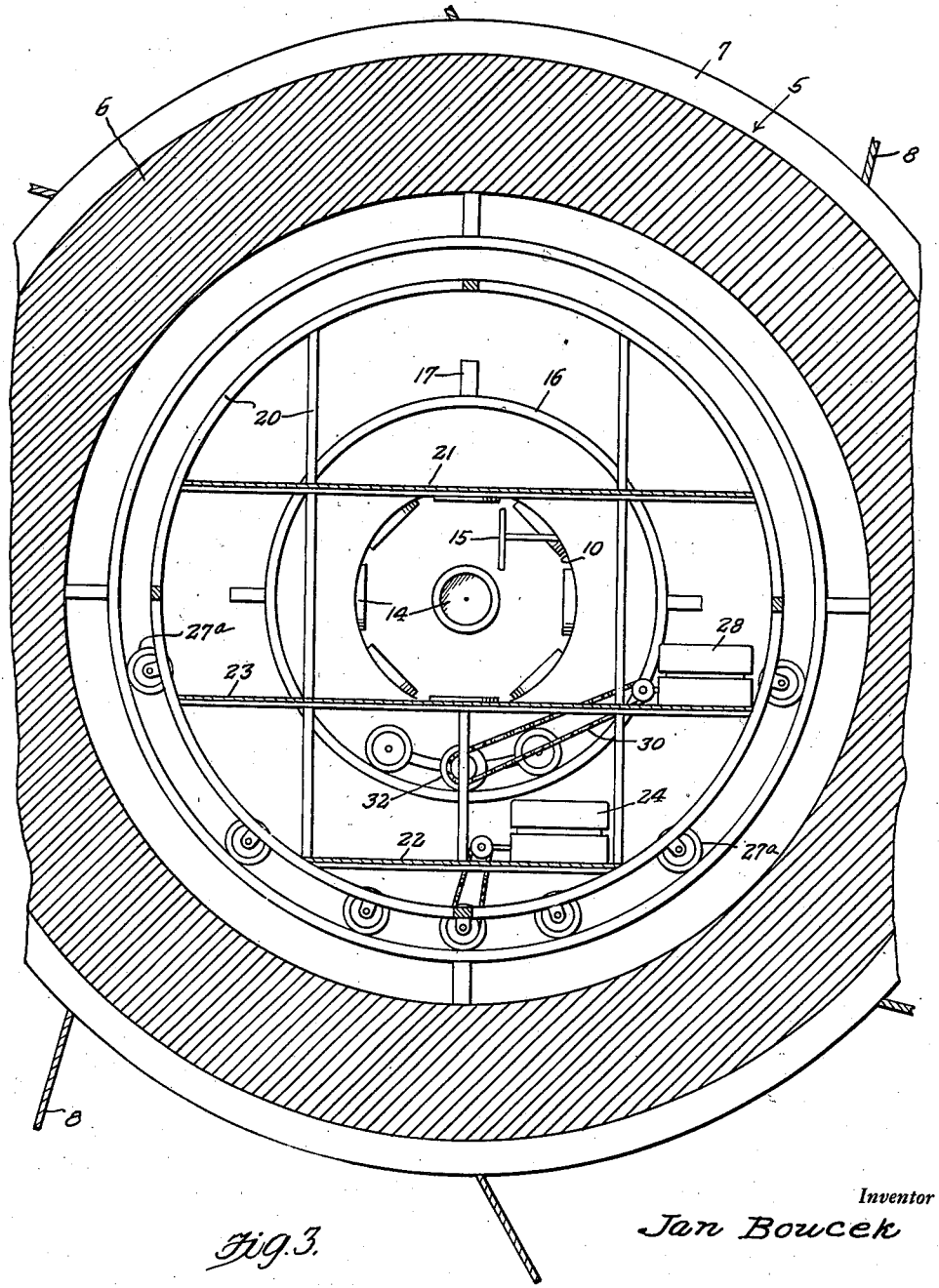
Figure 3 is a vertical sectional view taken substantially on the line 3—3 of Figure 2.

On the deck 22 is a power plant 24 driving a shaft 25 which at its ends has sprocket wheels driving chains 26, 26, which, in turn, drive wheels 27, 27 located under the platform 22 on the cage 20, these wheels 27, 27 engaging the tracks 18, 18. It can also be seen in Figure 3, that there are a number of idler wheels 27a, which also ride the tracks 18 and properly space the cage 20 from the tracks.

On the deck 23 is a power plant 28 driving a shaft 29 which, in turn, has sprocket wheels driving sprocket chains 30, 30. These chains operate on sprocket wheels on countershafts 31 and on these counter-shafts 31 are wheels 32 which ride the first-mentioned tracks 16.

It can now be seen, that in the operation of the vessel, the structure 6, 7, 8, 9 and 10 rotate while the cage 20 with its decks 21, 22 and 23 remain stationary relative to the hull structure. The hull structure is driven by the wheels 27 and 32 acting on the tracks 18 and 16, and obviously any suitable form of steering means may be resorted to in order to properly control the vessel.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A marine vessel comprising an annular keel of triangular cross-section providing converging side walls thereon, a pair of frontal conical sheels outstanding from opposite sides of the keel, respectively, and inclining from the side edges of said keel at the same angle as the sides of the keel, said shells forming with said keel a hull for rotation in the water, said shells having annular entrance vestibules at the outer sides thereof provided with side closures, a pair of annular tracks fixed in said keel at opposite sides thereof, respectively, a pair of annular tracks fixed in said shells, respectively, between the first-mentioned tracks and said vestibules, a cage structure within said keel mounted on the first-mentioned tracks to run thereon, and drive means between said cage and the second-mentioned pair of tracks.

JAN BOUCEK.